Jan. 27, 1970   R. T. NICKEL ET AL  3,491,480
VEHICLE ACTUATED LIVESTOCK BARRIER

Filed Aug. 31, 1967   2 Sheets-Sheet 1

INVENTORS
ROBERT T. NICKEL
PAUL R. NICKEL

BY Bartholomew Diggins

ATTORNEY

Jan. 27, 1970   R. T. NICKEL ET AL   3,491,480
VEHICLE ACTUATED LIVESTOCK BARRIER
Filed Aug. 31, 1967   2 Sheets-Sheet 2

INVENTORS
ROBERT T. NICKEL
PAUL R. NICKEL
BY Bartholomew Diggins
ATTORNEY

United States Patent Office 3,491,480
Patented Jan. 27, 1970

3,491,480
VEHICLE ACTUATED LIVESTOCK BARRIER
Robert T. Nickel, R.F.D. 1, Axtell, Nebr. 68924, and
Paul R. Nickel, Amherst, Nebr. 68812
Filed Aug. 31, 1967, Ser. No. 664,789
Int. Cl. E06b 11/04
U.S. Cl. 49—59                                    8 Claims

ABSTRACT OF THE DISCLOSURE

The livestock barrier constitutes a horizontal barrier platform of lightweight, electrically conductive pipe sections which is suspendded for free vertical movement from two support posts by suspension springs. Novel leveling brackets attached to the support posts electrically insulate the barrier platform therefrom and control the suspension height of the platform. Air biased piston units delay the return of the barrier platform to its suspended position after it has been moved into contact with the ground by a passing vehicle.

BACKGROUND

This invention relates to farm gates generally, and more particularly to an improved vehicle actuated livestock gate.

Numerous attempts have been made to develop an effective vehicle actuated gate for installation in the access opening in a ranch fence or similar animal enclosure. Such gates have normally been formed by a horizontal vehicle supporting member which is placed over a pit extending across the opening in an enclosure. This horizontal support unit is generally formed by spaced cross bar members which prevent cattle or other animals from crossing over the pit while providing a support for an automobile or similar vehicle.

Livestock gates employing this pit principle have been found to be subject to numerous disadvantages and deficiencies. For example, a gate formed over a pit must have sufficient strength to support vehicles passing over the pit, and therefore the use of expensive gate building materials to form a heavy structure is necessary. Additionally, blowing sand, dirt, and other debris tend to rapidly fill the underlying pit, and such pits must be periodically cleared of debris if the livestock barrier is to remain effective.

Subsequently, electrified barriers were developed in an attempt to eliminate the necessity of employing a pit and heavy structural building material in the formation of a stationary livestock barrier. Such barriers often included a horizontal frame which supported a plurality of substantially parallel electrical conductors. These conductors constituted horizontally extending wires which were intended to be moved against the ground beneath the frame when a vehicle passed thereover, or often the frame was provided with horizontal support springs to facilitate ground to wire contact. With such electrified wire supporting frames, insulation problems occur and the wires within the frames do not have sufficient structural strength to endure repeated vehicle passings. Therefore, these wires tend to become distorted or broken with resultant short circuiting between wires or the grounding of the gate circuit through contact between a wire and the ground. Also, the horizontal wires forming such barriers often do not present a visual barrier of sufficient magnitude to deter livestock from attempting to cross, and such attempts may result in damage to both the barrier and the livestock.

Some livestock gates move from a spaced horizontal position above the ground into contact with the ground upon passage with a vehicle thereover. These moving gates have, however, often caused damage to the underbody of vehicles passing thereover, and are often easily activated by livestock so that they do not always operate effectively to retain livestock within an enclosure. Such gates are also ponderous and therefore difficult to effectively electrify, while their moving feature generally makes effective insulation impractical.

It is the primary object of this invention to provide a novel and improved livestock gate of lightweight construction which will operate effectively to facilitate the passage of vehicles thereover while prohibiting the passage of livestock.

Another object of this invention is to provide a novel and improved livestock gate which operates effectively to block the passage of livestock without the necessity of providing a livestock pit in the ground beneath such gate.

A further object of this invention is to provide a novel and improved livestock gate which is vehicle-actuated to move from a normal spaced position above the ground into contact with the ground to permit the passage of a vehicle thereover but which operates effectively to prevent damage to such vehicle as the gate returns to its raised position.

Another object of this invention is to provide a novel and improved movable livestock gate of an electrified type which is constructed to withstand vehicle actuation and which may be easily adjusted to various heights above the ground.

A further object of this invention is to provide a novel and improved livestock gate of an electrified type which remains electrified in a normal spaced position above the ground but which becomes grounded upon the passage of a vehicle thereover.

Another object of this invention is to provide a novel and improved livestock gate of an electrified type which includes an improved insulation structure to permit free movement of the gate by an actuating vehicle; and A still further object of this invention is to provide a novel and improved livestock gate construction which includes improved electrical insulation features which permit the gate to operate effectively under all weather conditions.

These and other objects of this invention will become apparent upon a consideration of the specification and appended claims taken in conjunction with the accompanying drawings in which:

Figure 3:
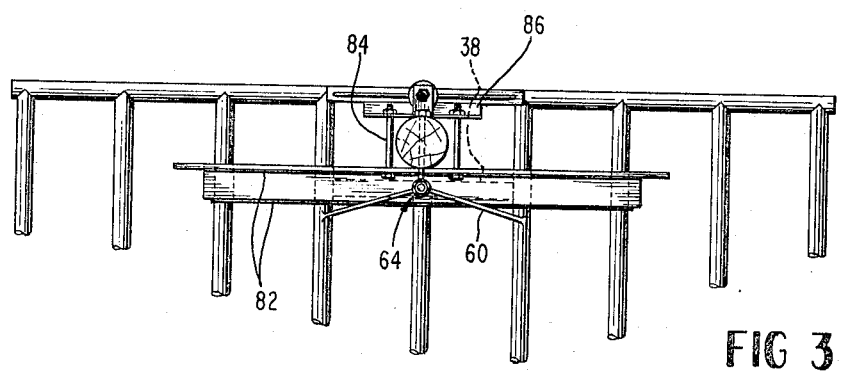
FIG. 3 is a partially sectioned plan view of the livestock gate of FIG. 2.
Figure 4:
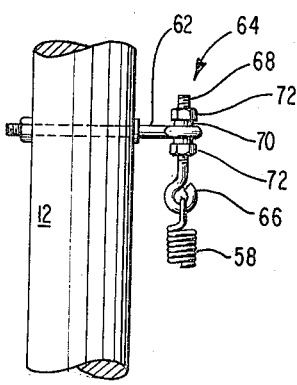

And FIG. 4 is a sectional view of the supporting post for the livestock gate of FIG. 3 illustrating the insulated post connections therefor.

Referring now to the drawings, the novel livestock gate of the present invention indicated generally at 10 includes a pair of spaced, vertical, substantially parallel support posts 12, the lower end of which is embedded in the ground, in concrete, or in other support material which may in turn be embedded in the ground beneath the livestock gate.

The support posts 12 extend vertically on either side of a vertically movable barrier platform 14, which forms both the livestock barrier and the vehicle support platform for the gate 10. This barrier platform is substantially rectangular in shape and is formed by electrically conductive pipe sections welded or otherwise suitably secured together in conductive relationship. The sides of the barrier platform are defined by two elongated pipe sections 16 and 18, while the ends of the platform are defined by shorter pipe sections, 20, 22, 24, and 26.

Actually, in constructing the barrier platform 14, two sections of platform indicated at 14a and 14b are joined together. Section 14a is defined by the elongated pipe section 16, the end pipe sections 20 and 24, and an elongated pipe section 28 secured between the end pipe sections parallel to the pipe section 16, while the platform section 14b is defined by the elongated pipe section 18, the end pipe sections 22 and 26, and an elongated pipe section 30 secured between the end pipe sections parallel to the pipe section 18. Subsequently, the platform sections 14a and 14b are completed by securing to the end pipe sections 20 and 24 and 22 and 26 a plurality of intermediate elongated pipe sections 32 and 34 which extend substantially parallel to the pipe sections 16 and 18.

When completed, the platform sections 14a and 14b are placed substantially parallel but spaced apart, and are then joined by short joining pipe sections 20, 22, 24, and 26 which are secured to the elongated pipe sections 28 and 30. These joining pipe sections are spaced inwardly from the end pipe sections 20, 22, 24, and 26, and therefore provide centrally positioned cutaway sections or indentations 40 and 42 at either end of the barrier platform 14. These cutaway sections are intended to receive the support posts 12 so that the support posts will extend well within the confines of the platform 14.

To complete the construction of the barrier platform 14, aditional central pipe sections, such as the elongated pipe section indicated at 44, are secured between the joining pipe sections 36 and 38 to extend parallel to the other elongated cross pipe sections 16, 28, 32, 18, 30, and 34. All of these elongated pipe sections are then braced by rows of short bracing pipes 46 which extend parallel to the end pipe sections 20, 22, 24, and 26 and are individually secured between each of the elongated cross pipe sections. These bracing pipes are arranged to form one or more central bracing rows for the platform, as indicated at 48, but more important, two pairs of closely spaced, parallel rows of bracing pipes are arranged on either side of the central bracing row to provide vehicle tracks 50 and 52. These vehicle tracks extend in substantially parallel, spaced relationship, and are positioned to provide additional bracing for the platform 14 along the path taken by vehicle wheels passing over the platform.

A pair of spaced, inclined vehicle ramps 54 are secured to the elongated pipe section 16, while a second pair of inclined vehicle ramps 56 are secured to the elongated pipe section 18. These vehicle ramps are aligned with the vehicle tracks 50 and 52, and permit the wheels of a crossing vehicle to pass onto the barrier platform 14.

It will be noted that the completed barrier platform 14 is formed from interconnected conductive pipe sections which provide a complete electrical circuit. These pipe sections, due to the novel bracing construction illustrated by FIG. 1, may constitute sections of lightweight, one-inch electrically conductive pipe which combine to form a strong, durable barrier platform.

The barrier platform 14 is freely suspended from the posts 12 by suspension springs 58, one end of which is connected to one of two hangar brackets 60 attached to the barrier platform 14. The opposite ends of the suspension springs are secured to post supports 62 by means of an insulated attachment 64 (FIG. 4). This attachment electrically insulates the suspension springs from the posts 12 and post supports 62, and constitutes a spring supporting hook 66 having a threaded shank 68. The shank 68 extends through an electrical insulating tube 70 which is inserted through an aperture in the post support 62. The shank is then firmly attached to the insulated tube by means of nuts 72 threaded thereon. Thus no electrical current can flow from the suspension springs 58 through the post supports 62 to the support post 12.

The suspension springs 58 cause the barrier platform 14 to hang from the posts 12 in a normal position above the surface of the ground beneath the platform, and the intervening space therebetween is determined by insulated leveling brackets 74 mounted upon each of the posts 12. Each of these leveling brackets includes a U-shaped platform control section 76 having two, substantially parallel downwardly projecting legs 78 connected by a horizontally extending section 80. Although the complete platform control section 76 can be formed from non-conductive electrical insulating material, this section is preferably constructed by forming the legs 78 and the connecting section 80 from sections of metal I beam. Subsequently, all outer contact surfaces of the platform control section are covered with thick sheets of weatherproof electrical insulating material, shown at 82 in FIG. 3.

The platform control sections 76 are installed with the legs 78 projecting downwardly through the space between elongated cross pipe sections of the platform, and these legs prevent the platform from contacting the posts 12 or swinging from the suspension springs. The height at which the barrier platform is to be suspended above the ground is determined, and the platform control sections 76 are adjusted to maintain the barrier platform at this height. To hold the barrier platform at the predetermined height, the platform control sections are secured to the posts 12 by mounting bolts 84 which extend from a platform control section along either side of a post 12 to a mounting bar 86. With the mounting bar positioned on the outer side of the post and the platform control section positioned on the inner side of the post, the mounting bolts may be tightened to securely hold the platform control section in a desired position against the post. By loosening the mounting bolts, it is possible to vary the position of the platform control section to alter the height of the barrier platform.

The leveling brackets 74 perform a number of very important functions which contribute to the overall effectiveness of the livestock barrier 10. For example, the leveling brackets permit the platform 14 to be freely suspended from the support posts 12 by the springs 58, so that the platform moves easily with substantially no frictional contact with the support posts. Also, as previously indicated, the leveling brackets permit the platform to be readily adjusted to any desired height above the ground, but more important, the leveling brackets completely insulate, and therefore electrically isolate the barrier platform from the posts 12. The posts cannot short the electrical circuit through the barrier platform, for electrical insulation is provided by securing insulating sheets 82 to every surface of the leveling brackets which might contact either the platform 14 or the posts 12. It will be apparent that should these insulating surfaces be subject to wear or weather deterioration, the leveling brackets may be easily removed from the support posts 12 so that the insulating surfaces can be rapidly replaced. There is no need to disassemble the livestock barrier, disturb the electrical circuitry therefor, or otherwise engage in repairs which are both costly and time-consuming, and thus the novel insulating leveling brackets not only adapt the livestock barrier for effective use under all weather conditions, but also make insulation repair both a simple and rapidly accomplished task. This is of prime importance if an electrified moving livestock barrier is to be effective.

When the barrier platform 14 is freely suspended from the support posts 12 by the suspension springs 58, the biasing action of the suspension springs tends to bias the platform upwardly away from the ground and holds the platform in a normal raised position against the horizontal sections 80 of the platform control sections 76. With the barrier platform so suspended, vehicle actuation thereof can occur. The wheels of a vehicle contacting the inclined ramps 54 or 56 would cause the barrier platform to move down the posts 12 into contact with the ground to permit vehicle passage thereover. However, as the vehicle wheels leave the barrier platform, the suspension springs 58 will tend to rapidly snap the platform upwardly to its normal position against the leveling brackets 74. In many instances, this will result in contact between the platform and the undercarriage of the vehicle and damage to the platform, the vehicle, or both will occur. Additionally, if the platform is electrified, this contact could result in injury to both the platform and the vehicle with an added likelihood of danger to the occupants of the vehicle.

To eliminate the danger of damaging contact between the barrier platform and the vehicle passing therefrom, a delay mechanism is provided to allow time for the vehicle to get clear before the suspension springs return the platform to its normal raised position against the leveling brackets 74. This delay mechanism is formed by an air cylinder and piston arrangement 88 which is connected between the platform and each of the support posts 12. This air cylinder and piston mechanism includes an air cylinder 90 which receives a reciprocating piston 92. The outer end of the piston is connected to a biasing bracket 94 which is secured to the barrier platform 14.

The air cyinlder 90 is attached to a support bracket 96 extending from each of the support posts 12, and this attachment, like the attachment of the suspension springs 58 to the support brackets 62, is designed to electrically insulate the air cylinder from the support posts. As in the case of the suspension spring attachment, the attachment for the air cylinders 90 includes a threaded shank 98 secured to the air cylinder and extending through an insulated tube 100 which is mounted in an aperture provided in the support bracket 96. The shank 98 is securely clamped to the insulating tube by means of nuts 102 threaded thereon.

The air cylinders 90 and the pistons 92 constitute a biasing air cylinder arrangement of a type which is well known. As the barrier platform 14 is lowered by a vehicle against the bias of the suspension springs 58, the pistons 92 move outwardly from the air cylinders 90 causing an air cushion to be drawn into the air cylinders behind the pistons. When the vehicle leaves the barrier platform, the suspension springs 58 attempt to return the platform to its normal raised position, but the air in the cylinders must be expelled before the pistons move into the cylinders to permit the platform to rise. Thus the platform rises slowly to provide a delay period during which the vehicle is permitted to clear the platform. Additionally, this delay may be adjusted, for each of the air cylinders is provided with an air intake adjust mechanism 104 of the type which is conventional to such devices. By adjusting the air intake, the pressure required to lower the barrier platform 14 and the time required for the platform to return to its raised position can be adjusted so that livestock cannot activate the barrier platform.

In installing the livestock barrier 10, the barrier platform 14 is normally positioned above the ground at a height which is determined by the type of vehicle which is likely to activate the platform. Generally, the barrier platform will be maintained at least four inches above the ground so that the inclined ramps 54 and 56 will clear by at least two inches. With the barrier platform so positioned, the spaced pipe sections making up the platform present a visual, physical barrier to livestock passage.

The support posts 12 extend through the indentations 40 and 42 in the barrier platform 14, and are thereby positioned within the confines of the barrier platform. These indentations are of sufficient size so that the leveling brackets 74 operate to prevent contact between the platform and the mounting posts. However, the indented position of the support posts also permits a surrounding fence or other enclosure to be terminated at a position directly adjacent the ends of the barrier platform, so that cattle or other livestock cannot circumvent the barrier by leaping through a space between the barrier and the surrounding fence. Additionally, the indented position of the support post permits the suspension springs 58 to extend vertically to the barrier platform 14 and to lift the barrier platform vertically from the ground.

Figure 1:
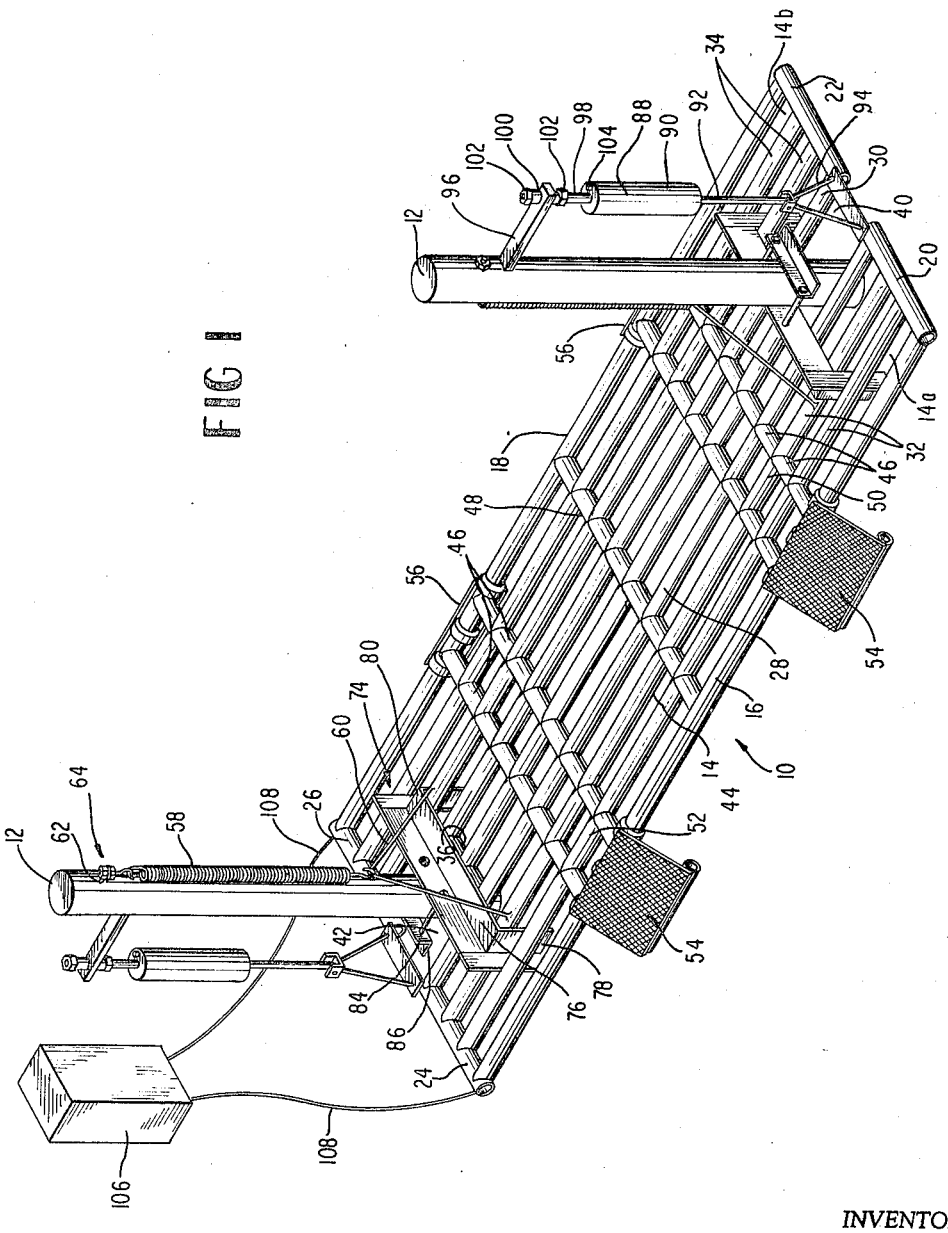
FIG. 1 is a perspective view illustrating the livestock gate of the present invention.
Figure 2:
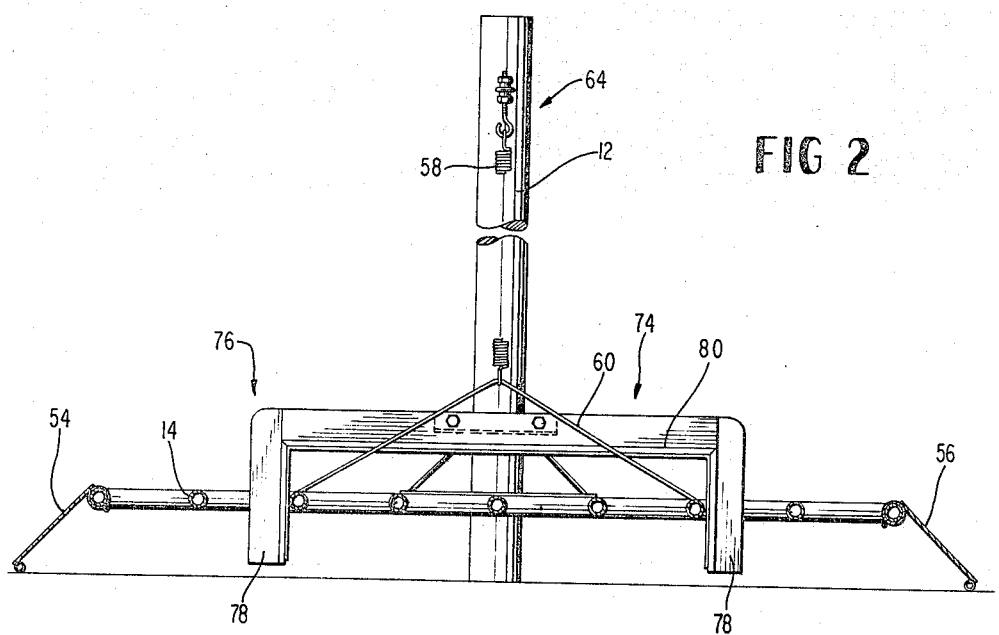
FIG. 2 is a sectional view in side elevation of the livestock gate of FIG. 1.

Electrical currents to charge the barrier platform 14 may be provided from a conventional battery fence charger indicated at 106 in FIG. 1 which is connected to the barrier platform by means of electrical connections 108. The electrical connections are of sufficient length to permit vertical movement of the barrier platform, and it is obvious that the charger 106 may be mounted on either of the support posts 12 or upon any other suitable support adjacent the livestock barrier 10.

In the operation of the livestock barrier 10, the barrier platform 14 is normally maintained in a raised position above the ground by the suspension springs 58, and in this position the pipe sections of the barrier platform are electrified by current provided through the electrical connections 108 from the fence charger 106. Electrical short circuiting of the barrier platform to ground through the support posts 12 is prevented by the insulated leveling brackets 74 and the insulated connections for the suspension springs 58 and the delay mechanisms 88.

When the wheels of a vehicle contact the inclined ramps 54 or 56 for the barrier platform, the platform is driven into contact with the ground against the bias of the suspension springs 58. Contact between the platform and the ground shorts the electrical circuit to ground, and the barrier platform is therefore not electrified during the passage thereover by a vehicle. The ground beneath the platform provides a support for the lightweight conductive pipe sections forming the platform, so that there is substantially no limit to the weight which can cross the barrier.

When the wheels of a vehicle leave the barrier platform, the delay mechanisms 88 maintain the barrier platform in contact with the ground for a delay period, and then permit the suspension springs 58 to slowly raise the platform back to its original position. It will be readily apparent to those skilled in the art that the present invention provides a novel and improved electrified livestock barrier having a novel structural design which attributes to such barrier all of the advantages of stationary pit barriers, non-electrified moving barriers, and electrified barriers without subjecting such barrier to the disadvantages thereof. The application of the apparatus of this invention, as well as the arrangement and types of components utilized therein may be subject to numerous modifications well within the purview of these inventors who intend only to be limited to a liberal interpretation of the specification and appended claims.

What is claimed is:

1. A vehicle actuated livestock barrier comprising spaced spaced support means, barrier platform means extending between said support means, resilient suspension means extending between said support means and said barrier platform means to suspend said barrier platform means in a generally horizontal barrier position spaced above an underlying surface, said suspension means being operative in response to positioning of either said front or rear wheels of a moving vehicle on said platform means to permit said barrier platform means to lower from said barrier position into solid contact with said underlying surface and to return toward the barrier position after each of said front and rear wheels pass therefrom, and delay means connected to said barrier platform means, said delay means operating against the bias of said suspension means to delay the full return of said barrier platform means to the barrier position until after both the front and rear wheels of said vehicle have cleared the barrier platform means.

2. The vehicle actuated livestock barrier of claim 1 which includes means for electrically charging said barrier platform means, said barrier platform means being formed from electrically conductive material so as to be grounded when it contacts said underlying surface, and insulator means associated with said resilient suspension means so that the livestock barrier remains electrically charged when the barrier platform is raised with respect to said underlying surface.

3. The vehicle actuated livestock barrier of claim 1 wherein said suspension means includes suspension springs extending between said support means and said barrier platform means, said suspension springs operating to bias said barrier platform means away from said underlying surface, said delay means operating to oppose the bias of said suspension springs and including an air cylinder, means connecting said air cylinder to said support means, a piston having one end contained within said air cylinder and a free end movable outwardly of said air cylinder, and means connecting the outer end of said piston to said barrier platform means.

4. The vehicle actuated livestock barrier of claim 1 wherein said barrier platform means includes a substantially rectangular frame, each end of said frame including a substantially centrally located cut-away section to provide an indentation for receiving said support means within the confines of said barrier platform means, a plurality of spaced, elongated cross-members extending in substantially parallel relationship across the length of said frame, each said elongated cross-member being connected at either end thereof to the ends of said frame, and bracing members secured between each of said cross-members and extending substantially perpendicularly thereto, said bracing members being arranged to form two spaced support tracks extending across the width of said frame and spaced to receive a vehicle wheel, each of said support tracks being formed by two, substantially parallel, closely spaced rows of bracing members.

5. The vehicle actuated livestock barrier of claim 1 wherein adjustable leveling means are mounted upon said support means to set the height of said barrier platform means with respect to the underlying surface, said leveling means being operative to limit movement of said barrier platform means in a horizontal plane, while permitting free movement of said barrier platform means toward said underlying surface.

6. The vehicle actuated livestock barrier of claim 5 wherein said leveling means includes an elongated, horizontally extending bar positioned above said barrier platform means, guide legs extending downwardly from said elongated horizontal bar through said barrier platform means and terminating at a point spaced above said underlying surface, and bracket means connected to said elongated, horizontal bar for mounting said bar upon said support means for adjustment relative thereto.

7. The vehicle actuated livestock barrier of claim 5 wherein said insulating means includes leveling means adjustably mounted upon said support means and operative to limit the horizontal movement of said barrier platform means while permitting free vertical movement thereof between said barrier position and the underlying surface, said leveling means being formed to electrically insulate said barrier platform means from said support means.

8. The vehicle actuated livestock barrier of claim 7 wherein said barrier platform means is formed by interconnected electrically conductive pipe sections, said pipe sections being conductively interconnected to form substantially rectangular frame, a plurality of elongated cross sections extending in substantially parallel, spaced relationship along the width of said frame and connected to the ends thereof, and a plurality of bracing pipe sections extending between said substantially parallel cross sections.

References Cited

UNITED STATES PATENTS

| | | | |
|---|---|---|---|
| 1,259,581 | 3/1918 | Zorn | 49—132 X |
| 2,024,063 | 12/1935 | Roper | 49—131 |
| 2,561,683 | 7/1951 | Benke | 49—274 X |
| 2,744,728 | 5/1956 | Melchert et al. | 49—131 X |
| 2,899,174 | 8/1959 | Wells | 256—10 |
| 3,256,637 | 6/1966 | Torrey | 49—131 X |

FOREIGN PATENTS 29,773    4/1931    Australia.

DENNIS L. TAYLOR, Primary Examiner

U.S. Cl. X.R.

49—131